United States Patent
Nothroff

(10) Patent No.: US 10,518,710 B2
(45) Date of Patent: Dec. 31, 2019

(54) MOUNTING BRACKET FOR CONSOLE BACKGROUND

(71) Applicant: FORD GLOBAL TECHNOLOGIES, LLC, Dearborn, MI (US)

(72) Inventor: Ralf Nothroff, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/602,763

(22) Filed: May 23, 2017

(65) Prior Publication Data
US 2017/0341589 A1    Nov. 30, 2017

(30) Foreign Application Priority Data

May 27, 2016 (IN) .............................. 201641018380

(51) Int. Cl.
| | | |
|---|---|---|
| *B60R 7/04* | (2006.01) | |
| *F16M 13/02* | (2006.01) | |
| *B60R 13/02* | (2006.01) | |

(52) U.S. Cl.
CPC ............ *B60R 7/04* (2013.01); *B60R 13/0206* (2013.01); *B60R 13/0262* (2013.01); *F16M 13/02* (2013.01)

(58) Field of Classification Search
CPC .................................. B60R 7/04; F16M 13/02
See application file for complete search history.

(56) References Cited

U.S. PATENT DOCUMENTS

| | | | | | |
|---|---|---|---|---|---|
| 2,859,606 | A | * | 11/1958 | Scardino | .................. A47K 5/02 220/477 |
| 3,606,447 | A | * | 9/1971 | Ryding | .................. B60R 7/088 296/37.12 |
| 4,309,012 | A | * | 1/1982 | Fukunaga | .............. B60K 35/00 248/27.1 |
| 4,524,933 | A | * | 6/1985 | Rouws | .................. B60K 37/04 248/27.3 |
| 4,577,818 | A | * | 3/1986 | Clarisse | ................. B60K 37/04 248/27.3 |
| 4,858,067 | A | * | 8/1989 | Rochelle | .................. H02B 1/40 220/3.94 |

(Continued)

FOREIGN PATENT DOCUMENTS

EP    1873014 B1    12/2009

OTHER PUBLICATIONS

English Machine Translation of EP1873014B1.

*Primary Examiner* — Anita M King
(74) *Attorney, Agent, or Firm* — Vichit Chea; King & Schickli, PLLC

(57) ABSTRACT

A mounting bracket to hold a console frame member includes a base support component, a first side component plate, and a second side component plate. The base support component includes a base portion and a back support portion having a first end and a second end. The base portion is fixed to a floor of a vehicle and the back support portion vertically extends from the base portion. The first side component plate and second side component plates extend toward a front side of the mounting bracket from the first end and the second end. The base support component, the first side component plate, and the second side component plate collectively form an impact absorbing section.

7 Claims, 3 Drawing Sheets

(56) References Cited

U.S. PATENT DOCUMENTS

| | | | | |
|---|---|---|---|---|
| 4,913,384 | A * | 4/1990 | Inamura | B60K 37/04 248/27.3 |
| 5,169,097 | A * | 12/1992 | Yasukawa | B60K 37/04 248/27.1 |
| 5,779,197 | A * | 7/1998 | Kim | B60K 37/04 248/27.1 |
| 5,853,103 | A | 12/1998 | Yamazaki | |
| 6,056,337 | A | 5/2000 | Oguri et al. | |
| 6,179,253 | B1 * | 1/2001 | Cotton | B60K 35/00 248/27.1 |
| 6,651,936 | B2 * | 11/2003 | Upson | B60K 37/04 248/27.1 |
| 6,688,069 | B2 * | 2/2004 | Zadeh | E04B 1/2403 52/712 |
| 7,303,170 | B2 * | 12/2007 | Fan | G06F 1/187 248/27.3 |
| 7,311,333 | B2 | 12/2007 | Sato et al. | |
| 7,658,357 | B2 | 2/2010 | Babian | |
| 7,823,934 | B2 * | 11/2010 | Huang | G11B 33/12 248/27.1 |
| 8,444,196 | B2 | 5/2013 | Arndt et al. | |
| 8,555,592 | B2 * | 10/2013 | Daudet | E04B 1/2403 52/489.1 |
| 8,567,728 | B2 * | 10/2013 | Washiyama | B60R 11/02 248/200 |
| 8,845,019 | B2 | 9/2014 | Sawada | |
| 9,233,785 | B2 * | 1/2016 | Hirama | B65D 51/243 |
| 9,561,746 | B2 * | 2/2017 | Parlow | B60N 3/102 |
| 2005/0062320 | A1 * | 3/2005 | Duerr | B60N 3/10 297/188.19 |
| 2015/0375595 | A1 | 12/2015 | Fesenmyer et al. | |

\* cited by examiner

MOUNTING BRACKET FOR CONSOLE

BACKGROUND

TECHNICAL FIELD

The present subject matter relates to a console unit for a vehicle, and particularly, but not exclusively, relates to a mounting bracket to secure the console unit in the front portion of a vehicle.

BACKGROUND

Components of modern automotive vehicles, particularly components forming the interiors of the automotive vehicles are designed to serve multiple purposes, such as utility, luxury, impact absorbance, or the combination thereof. A vehicle may include a console unit extending upwardly from the floor of the vehicle and between adjacent front seats. The console unit may typically include a storage unit with multiple storing compartments, and utility holders, such as a cup holder, a pen holder, and the like.

The console unit also has to be stable and at the same time be so structured that it aids in absorption of any external forces that may act on the vehicle. For example, in case of an impact, the console unit may pose threat of misalignment or damage of the console unit itself or items stored in it. Console units which are rigidly deployed within the vehicle may not absorb any shocks which may be conveyed in case of any vehicular impact. To this end, the console unit has to be mounted on the vehicle with adequate firmness to provide stability to the console unit, and at the same time, with adequate flexibility in order to absorb energy applied by excessive forces or inadvertent impacts.

U.S. Pat. No. 7,658,357 ('357 patent), describes a mounting bracket for mounting a console in an automotive vehicle. The mounting bracket has a base, a central leg, a top, and at least one sidewall that extends upwardly from the floor of the vehicle. The base is attached to the vehicle floor by conventional fasteners in the conventional fashion. The central leg extends upwardly from the base. A top is attached to an upper end of the central leg, and is in a substantially horizontal plane. A fastener is provided through the top to attach the console to the bracket top. A side flange is also attached to the top. The side flange is in a substantially vertical plane, and is adapted to abut against a console sidewall. According to the '357 patent, the console is secured by the fastener attached to the top, and abutment of the side flange against the console side wall supports the console sidewall against lateral forces and impacts. Each of the base, the central leg, the top, and the side flange includes a planar midsection and a supporting rib along each side to rigidify the mounting bracket.

It is observed that in the mounting bracket described in the '357 patent, a central leg protruding upwardly for supporting the upper wall of console is adequately rigid and stiff to secure the console, however, not amenable to bend in event of a vehicular collision to absorb impact energy. The rigid structure also prevents deformation of the mounting bracket in a lateral direction in order to absorb lateral forces. Consequently, the sidewall may not suffice to adequately absorb impact energy. In such a situation, the console may not sustain vertical or lateral impacts, resulting in an ineffective console for the vehicle.

SUMMARY

This summary is provided to introduce concepts related to a console mounting bracket for a console unit. This summary is not intended to identify essential features of the claimed subject matter nor is it intended for use in determining or limiting the scope of the claimed subject matter.

The mounting bracket for the console unit, according to the present subject matter, is provided to hold a console frame member between adjacent seats of a vehicle. The mounting bracket includes a base support component, a first side component plate, and a second side component plate. The base support component has a planar and longitudinally extending base portion and a back support portion. The back support portion has a first end and a second end. The base portion is fastened to a floor of the vehicle. According to an aspect, from one of longitudinal edges of the base portion, a back support portion extends vertically, with respect to the plane of the base portion. In an example, the fastened base portion and protruding back support portion form an impact absorbing section to absorb vertical forces or head impact.

According to another aspect, the first side component plate extends from the first end of the back support portion, and the second side component plate extends from the second end of the back support portion. In an illustration, the first end may be a right side end of the back support portion, and similarly, the second end may be a left side end of the back support portion. Further, according to said aspect, the first side component plate and the second side component plate extend from the back support portion in plane positioned at an angle with respect to the base portion and the back support portion. In an example, the first side component plate, the second side component plate, and the back support portion form an impact absorbing section to absorb lateral forces or side impacts.

The console member frame is detachably mounted in the impact absorbing sections. As a result, impact energy from head impacts or side impacts can be dissipated by the mounting bracket, substantially protecting a vehicle occupant's head from getting injured by the adverse impacts. In an event of mild static load application, the bracket holds the console frame member with adequate rigidity.

BRIEF DESCRIPTION OF DRAWINGS

The following detailed description references the drawings, wherein.

Figure 1:
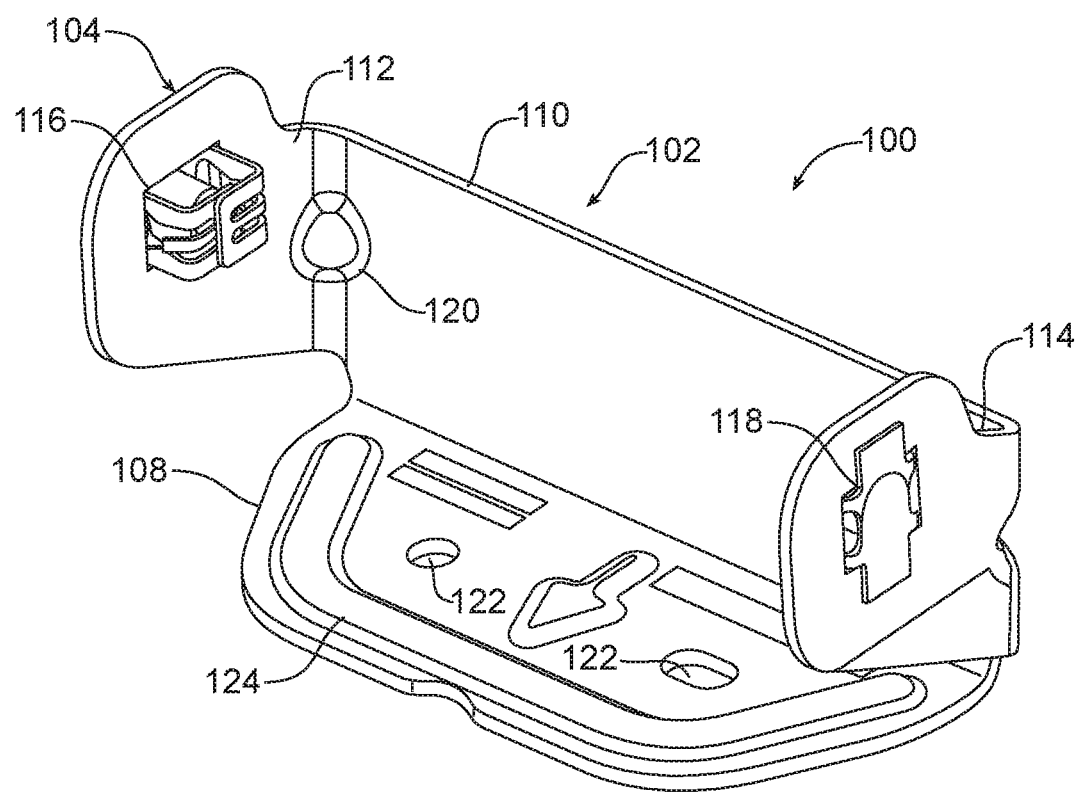
FIG. 1 illustrates a front perspective view of a mounting bracket, in accordance with an implementation of the present subject matter.

Generally, to mount a console unit to a floor of a vehicle, mounting brackets are provided with fastening components. The mounting brackets may be of different characteristics, based on their shapes, material, and a method of fastening the console unit to the mounting bracket. For example, the mounting bracket may form a Z-shape profile, an H-shape profile, a U shape profile, and the like. The mounting bracket can be made up of a metal to provide adequate strength to secure the console unit using fasteners. Conventionally, a first portion of the mounting bracket is mounted on a floor of a vehicle. A second portion of the mounting bracket is extended upwardly from the first portion of the mounting bracket to support a console frame member. The console frame member is fixed to the first portion, thereby to the floor of the vehicle. The console frame member is firmly supported by the second portion of the mounting bracket. Thus, structure of the mounting bracket can provide stability to the console frame member.

Generally conventional mounting brackets may be rigidly supported and hence are resilient to any deformation in the event it is subject to loads, say on occurrence of a vehicular impact. Due to its resilient properties, the mounting brackets do not provide any absorption of excessive forces, thereby resulting in such forces to traverse through the vehicles. Such unexpended force may result in further damage to the interior and also to the passengers who may be present inside the vehicle.

In conventional technology, whether it may be lateral or vertical impact forces or forces applied under maximum acceleration, the same area of the mounting bracket gets affected, which causes inefficient distribution of the impact energy over the mounting bracket and results in breakage or damage of the console unit. At such instances, the mounting bracket has to be provisioned with separate components to absorb different type of forces applied in different direction, i.e., segregating impact absorbing areas based on type and direction of the force.

The present subject matter relates to a mounting bracket for a console unit. According to an aspect, the mounting bracket is designed to withstand dynamic as well as static loads. As will be explained in the following sections, the various components of the mounting brackets form an impact absorbing section where the console frame member has to be mounted. Impact energy applied on the console frame member is absorbed at the impact absorbing section. For instance, in case of dynamic impact loading, the various components can absorb impact energy loaded on the console frame member by way of deformation. In addition, the mounting bracket is designed to withstand a static impact load such that the static impact load is distributed over a base portion. Therefore, the mounting bracket can provide firm support to the console frame member.

According to an embodiment, the mounting bracket can include a base support component, a first side component plate, and a second side component plate. The base support component includes a base portion and a back support portion. According to an aspect, the base portion is a planar and longitudinally extending portion, horizontally attached to a floor of the vehicle. The back support portion extends vertically from the base portion along one of its longitudinal edges. Thereby, the back support portion and the base portion form a bend at slightly more than 90° forming a substantial right angle.

Further, the back support portion has a first end and a second end. In an example, the first end may be at right side of the back support portion when viewed from a front side of the mounting bracket. Similarly, the second end may be at left side of the back support portion when viewed from the front side of the mounting bracket. According to one aspect of the embodiment, the first side component plate extends from the first end of the back support portion. The first side component plate extends in a plane positioned at a substantial right angle with respect to the back support portion towards the front side of the mounting bracket. According to said aspect, the second side component plate extends from the second end of the back support portion. The second side component plate extends in a plane positioned at a substantial right angle with respect to the back support portion towards the front side of the mounting bracket.

According to said embodiment, the base support component, the first side component, and the second side component collectively form an impact absorbing section. The console frame member is fastened to the mounting bracket in such a way that the console frame member fits into the impact absorbing section. The impact absorbing section is designed to withstand dynamic as well as static loads. In one example of dynamic impact, the console unit may have to bear a side impact load, i.e., a vehicle occupant may misuse the console unit and apply additional force in the lateral direction. In such an instance, the first side component plate and the second side component plate exhibit resilient properties for deformation, and hence, provide firm support to both sides of the console frame member. Resilient properties of the first and second side component plates prevent major deformation, and instead, results in minor lateral deformation of the console frame member. Further, the base support portion is under torsional stress around screw points of the base portion, and therefore, the impact energy is transmitted to the vehicle floor. Thus collectively, the minor lateral deformation can absorb a part of the impact energy and the rest of the impact energy can be transmitted to the vehicle floor, avoiding misalignment of the console frame member.

In one example of static load application, the console unit may have to bear a head impact load, i.e., for Computer Aided Engineering (CAE) or physical test, a vertical force may be applied on the console unit. In the event of head impact load application, the back support portion bend down in a certain angle as such tilting the mounting bracket towards the front side of the mounting bracket. Additionally, due to impact energy, the console frame member is slightly deformed towards the vehicle floor, as if the console frame member is being pushed downwards. In turn, the deformation reduces a ground clearance between the console frame member and the floor, transmitting the impact energy towards the ground level. Collectively, the deformation of the mounting bracket and the console frame member absorbs a part of the head impact energy, and the rest of the impact energy is transmitted to the ground. Thus, the console unit can be prevented from being damaged or misaligned.

Thus, said embodiment presents a balanced combination of stiffness and flexibility to support the console frame member in static as well as dynamic load. As a result, the mounting bracket holds the console frame member with adequate rigidity and flexibility, dissipating the impact energy. Thus, due to dissipation of the impact energy, further mishaps, such as injury to a vehicle occupant's head that might have caused from collision, can be avoided or minimized. For example, the vehicle occupant's head against deceleration above 80 g in case of impact can be protected. In an event of a mild static load application, the bracket holds the console frame member with adequate rigidity to provide a stable console unit.

The above mentioned implementations are further described herein with reference to the accompanying figures. It should be noted that the description and figures relate to exemplary implementations, and should not be construed as a limitation to the present subject matter. It is also to be understood that various arrangements may be devised that, although not explicitly described or shown herein, embody the principles of the present subject matter. Moreover, all statements herein reciting principles, aspects, and embodiments of the present subject matter, as well as specific examples, are intended to encompass equivalents thereof.

Figure 2:
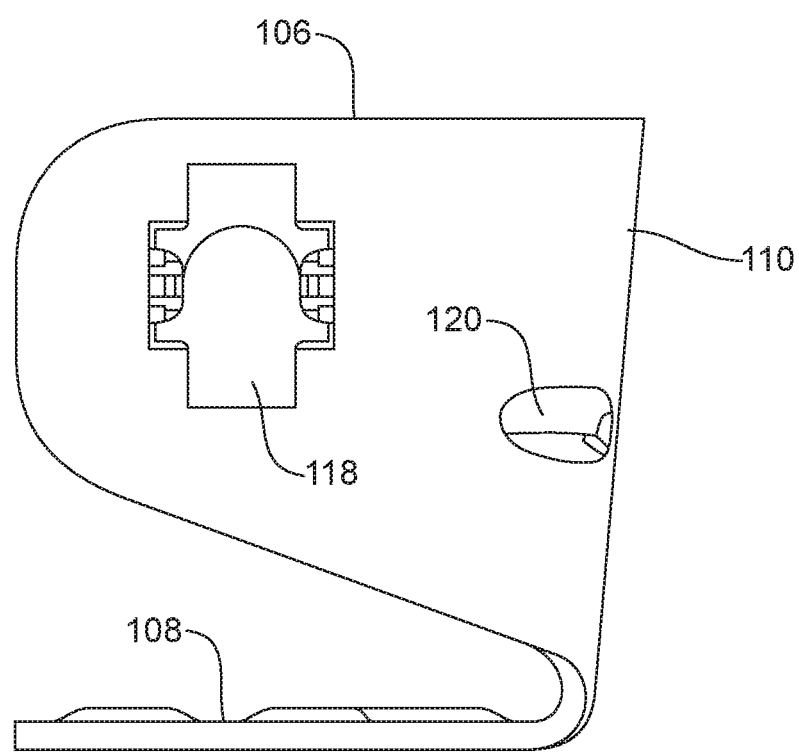
FIG. 2 illustrates a side elevational view of the mounting bracket, in accordance with another implementation of the present subject matter.

FIG. 1 and FIG. 2 illustrate a mounting bracket 100 for a console unit, in accordance with an example of the present subject matter. FIG. 1 illustrates a front view of the mounting bracket 100 and FIG. 2 illustrates side view of the mounting bracket 100. For the sake of brevity and ease of understanding, the description of FIG. 1 and FIG. 2 is provided in conjunction.

The mounting bracket 100 is fixed to a vehicle to hold a console frame member of the console unit between adjacent front seats of the vehicle. According to an embodiment, the mounting bracket 100 includes a base support component 102, a first side component plate 104, and a second side component plate 106.

As evident from the name, in an implementation of said embodiment, the base support component 102 forms a base to secure the console frame member to a floor of the vehicle and to provide support to the console frame member in event of an impact. To serve said purpose, the base support component 102 is formed by a base portion 108 and a back support portion 110.

The base portion 108 is a planar and longitudinally extending portion which is attached to the floor of the vehicle in order to secure the console frame member to the floor of the vehicle. According to the implementation, the base portion 108 can include at least one receiver or hole 122 or at least one receiver or oblong aperture 122 or combination thereof. By using nut-bolt mechanism the base portion 108 can be attached to the floor.

In said implementation of the base support portion, a back support portion 110 extends vertically from the base portion 108 with respect to the plane of the base portion 108. Thereby, the vertical extension forms a bend at slightly more than 90° forming a substantial right angle between the base portion 108 and the back support portion 110. The base support portion 102 can bend absorbing the impact energy, and resulting in slight deformation of the console frame member towards the ground level. For example, if CAE test is being carried out at maximum acceleration of the vehicle. During the test, head impact can be applied onto the console frame member in vertical direction. Upon application of the head impact, the base support portion bends and impact energy is absorbed at the bend by a base support component 102. Additionally, the impact energy causes slight deformation of components of the console frame member as if the console frame member is being pushed downwards. In turn, the deformation reduces a ground clearance between the console frame member and the floor, transmitting the impact energy towards the ground level. By absorption of part of the impact energy in the form of slight deformation of the console frame member and the base support component 102 caused by bending action, the mounting bracket 100 sustains static impacts.

Further, the back support portion 110 has a first end 112 and a second end 114. In one example, the first end 112 indicates a right side end of the back support portion 110, whereas the second end 114 indicates a left side of the back support portion 110.

According to an implementation, the first side component plate 104 extends from the first end 112, and similarly, the second side component plate 106 extends from the second end 114. In said implementation, the first side component plate 104 extends in a plane positioned at slightly more than 90° forming a substantial right angle with respect to the back support portion 110 towards the front side of the mounting bracket 100. According to said implementation, the second side component plate 106 extends from the second end 114 of the back support portion 110. The second side component plate 106 extends in a plane positioned at a substantial right angle with respect to the back support portion 110 towards the front side of the mounting bracket 100.

According to an implementation, the first side component plate 104 can have a mating portion 116 and the second side component plate 106 can have a mating portion 118, where the mating portions 116, 118 are formed as a recess. The recess facilitates coupling between both side component plates and the console frame member (not shown).

The console frame member is coupled between the first side component plate 104 and the second side component plate 106 in such way that both side component plates 114, 118 provide firm support to the console frame member to withstand dynamic impacts. At the same time, the console frame member is coupled with adequate flexibility such that in an event of the impact minor lateral deformation of the console frame member 302 is caused. Further, as the mounting bracket 100 is under torsional stress around screw points fixed to the floor, the impact energy is transmitted towards the ground level. Thus, the console frame member may be prevented from major deformation. For example, a vehicle occupant misuses force and applies it on the console frame member in X-Z plane. As should be understood, according to the vehicle coordinates, X-Z plane can be defined as the vertical longitudinal zero plane which is parallel to a longitudinal centerline of the vehicle. Usually, excessive force may have caused deformation of the console frame member in lateral direction posing threat to alignment of the console unit. However, according to said implementation, a part of the excessive force is absorbed by the minor lateral deformation and the rest of the excessive force is transmitted to the ground level.

According to said embodiment, the base support component 102, the first side component 104, and the second side component 106 collectively form an impact absorbing section. The console frame member is fastened to the mounting bracket 100 in such a way that the console frame member fits into the impact absorbing section. Impact energy applied on the console unit along X-Z plane can be partly absorbed at the bend by the base support component and partly by the console frame member 302 in the form of deformation (see FIG. 3). Whereas a part of the impact energy applied along Y-Z-plane is transmitted towards ground level and distributed as torsional stress around screw points of the base portion 108 fixed to the floor of the vehicle, a part of the impact energy is also absorbed by the minor lateral deformation of the console frame member 302. As should be understood, according to the vehicle coordinate system, the Y-Z plane can be defined as the vertical transverse zero plane which is perpendicular to the X-Z plane.

In addition, according to one implementation, the mounting bracket 100 includes protrusion 120 at a corner formed between the back support portion 110 and the first side component plate 104 as shown in FIG. 1, and also at a corner formed between the back support portion and the second side component plate 106 as shown in FIG. 2 to provide additional stiffness to the back support portion 110, a first side component plate, and the second side component plate, in the event of impact loading. According to another aspect, upper edges of the first side component 104 and the second side component 106 are uplifted from an upper edge of the back support portion 110 to provide firm side support to the console frame member. Additionally, the base portion 108 includes a depression curve 124 to provide additional rigidity to the base portion 108.

Figure 3:
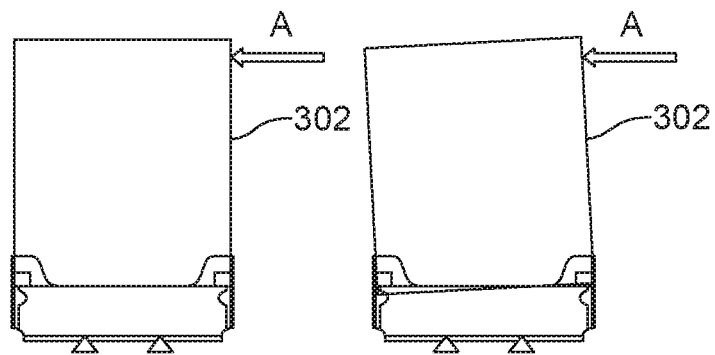
FIG. 3 illustrates an example of a dynamic load application on the mounting bracket, in accordance with another implementation of the present subject matter.

FIG. 3 depicts behavior of the resilient properties of the mounting bracket 100 in an event of dynamic impact on the console unit. As should be understood, dynamic forces are time dependent, act for a small interval of time, or quickly change in magnitude or direction. Machinery vibration or sudden jerks caused by earthquake or an accident can be considered as examples of dynamic forces. In an example, due to misuse of forces or accidental event, a vehicle occupant may apply excessive forces, say up to 445 N, on the console unit in lateral direction at predefined minimum speed, i.e., 24.1 kph as specified by Economic Commission for Europe under Regulation Number 21. The console frame member 302 is coupled to the first and second side component plates 104, 106, in such a way that minor lateral deformation of the console frame member 302 can be observed in an event of the impact. A part of the impact energy is absorbed by the deformation. Further, as the impact absorbing section formed by the back support portion 110 and the first and second side component plates 104, 106, respectively, is under torsional stress around screw points fixed to the floor, impact energy is distributed over the screw points, and in turn, it is transmitted to the ground level. Thus, absorption of the part of the impact energy by the minor deformation and transmission of the rest of the impact energy to the ground prevent major deformation of the console frame member 302. Hence, damages occurred due to major deformation of the console frame member 302 can be avoided.

Figure 4:
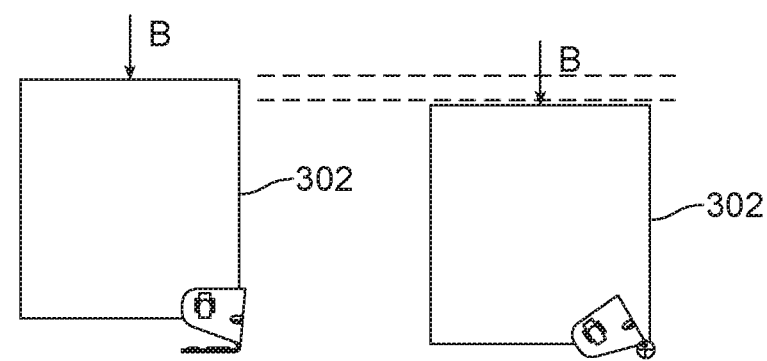
FIG. 4 illustrates an example of a static load application on the mounting bracket, in accordance with another implementation of the present subject matter.

FIG. 4 illustrates behavior of mounting bracket 100 in an event of static impact on the console unit. As would be understood, static forces are the forces that are gradually applied and have no or less dependence on time. Live force gradually increasing magnitude applied on a structure can be considered as a static force. In an example, the CAE test may be performed on the console unit and gradual forces may be applied on the console unit in vertical direction such that the console unit would bear head impact of A J, say up to 152 J, at predefined minimum speed, i.e., 24.1 kph as specified by Economic Commission for Europe under Regulation Number 21. When the forces are applied along the X-Z plane, head impact load is absorbed by the base support component 102. Due to head impact, a bend formed between a base portion 108 and a back support portion 110 bends, thereby tilting the console frame member 302 towards the front side of the mounting bracket 100. This tilting action reduces the angle formed between the base portion 108 and the back support portion 110. Reduction in the angle is subject to energy applied by the head impact load. Further, the impact energy causes slight deformation of components of the console frame member 302 as if the console frame member is being pushed downwards. In turn, the deformation reduces a ground clearance between the console frame member and the floor, transmitting a part of the impact energy towards the ground level. Thus, bending causes deformation of the back support portion 110 about Z axis, and deformation of the console frame member 302 towards the ground level. As should be understood, according to the vehicle coordinate system, Z axis can be defined as a vertical axis with respect to the vehicle. A part of the impact energy is thus absorbed in a form of the deformation, and rest of the impact energy is transmitted to the ground level.

Although implementations for a mounting bracket 100 have been described in language specific to structural features and/or methods, it would be understood that the appended claims are not necessarily limited to the specific features or methods described. Rather, the specific features and methods are disclosed as example implementations for the mounting bracket 100.

What is claimed:

1. A mounting bracket to hold a console frame member between adjacent front seats of a vehicle, the mounting bracket comprising,
   a base support component having a planar and longitudinally extending base portion and a back support portion having a first end and a second end, wherein the back support portion extends vertically, with respect to the plane of the base portion, from one longitudinal edge of the base portion such that a substantial right angle is formed between the base portion and an entirety of the back support portion;
   a first side component plate extending from the first end of the back support portion in a first plane positioned at a first angle with respect to the base portion and the back support portion; and
   a second side component plate extending from the second end of the back support portion in a second plane positioned at a second angle with respect to the base portion and the back support portion,
   wherein the mounting bracket is capable of sustaining at least one of static impact load and dynamic impact load applied on it at a speed minimum of about 24.1 kph.

2. The mounting bracket as claimed in claim 1, wherein the base portion comprises a receiver for attaching the mounting bracket to the vehicle by fasteners.

3. The mounting bracket as claimed in claim 1, wherein the base portion comprises a set of oblong apertures for attaching the mounting bracket to the vehicle by fasteners.

4. The mounting bracket as claimed in claim 1, wherein each of the first side component plate and the second side component plate comprises a respective receiver for securing the console frame member.

5. The mounting bracket as claimed in claim 1, wherein the mounting bracket is made of alloy metal.

6. The mounting bracket as claimed in claim 1, wherein the base portion is attached to a floor of the vehicle in order to secure the console frame member to the floor of the vehicle.

7. The mounting bracket as claimed in claim 1, wherein at least one protrusion is provided on an inner surface of the mounting bracket at a first corner formed between the back support portion and the first side component plate and at a second corner formed between the back support portion and the second side component plate.

* * * * *